March 5, 1940.   H. W. JONES   2,192,661
NOZZLE
Filed May 19, 1936   2 Sheets-Sheet 1
FIG. 1
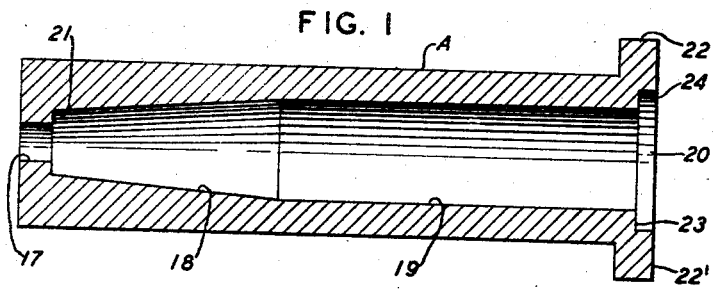
FIG. 2
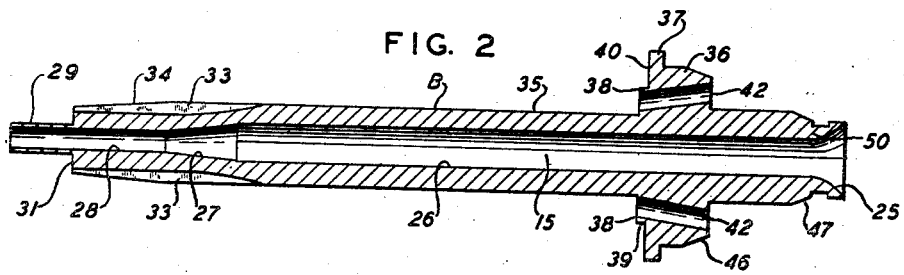
FIG. 3
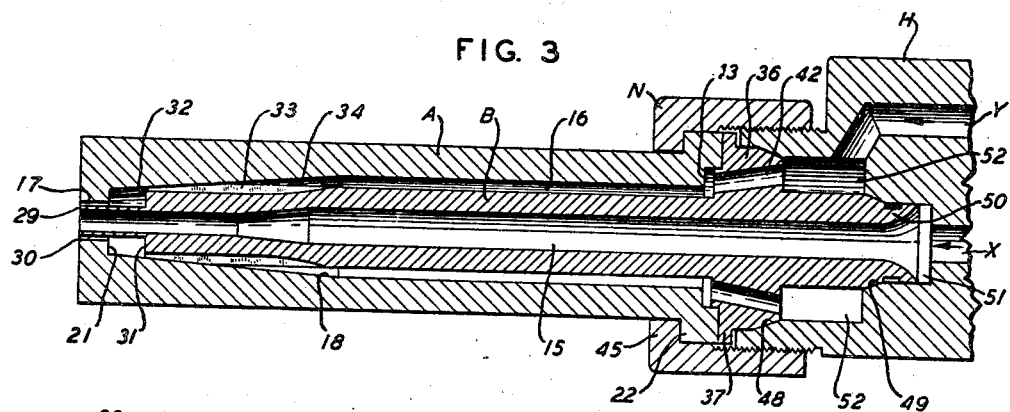
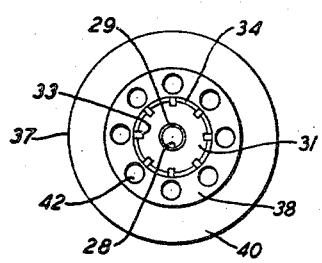
FIG. 4
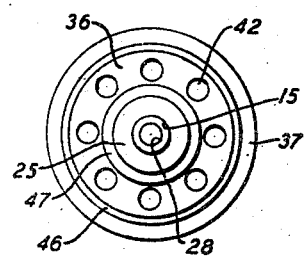
FIG. 5
INVENTOR
HOMER W. JONES
BY
ATTORNEY March 5, 1940.    H. W. JONES    2,192,661
NOZZLE
Filed May 19, 1936    2 Sheets-Sheet 2

INVENTOR
HOMER W. JONES
BY
ATTORNEY

Patented Mar. 5, 1940

2,192,661

UNITED STATES PATENT OFFICE 2,192,661

NOZZLE

Homer W. Jones, Westfield, N. J., assignor to The Linde Air Products Company, a corporation of Ohio Application May 19, 1936, Serial No. 80,515

4 Claims. (Cl. 158—27.4)

This invention relates to blowpipe nozzles, and more particularly to an improved nozzle capable of delivering an annular gaseous jet of uniform length. The invention is especially useful in metal cutting and similar nozzles by means of which a jet of oxidizing gas, such as commercially pure oxygen, and a surrounding annular preheating flame of combustible gas, such as a mixture of acetylene and oxygen, are simultaneously applied to a metal body to cut the same. However, features of the invention may also be used in nozzles employed for welding and flame hardening metals.

Cutting blowpipe nozzles have heretofore been constructed of two concentric members, an internal member telescoped within an external member; and such members have been provided with the necessary gas passages, an axial passage through the internal member to deliver the cutting oxygen jet and an annular passage between the two members to deliver the preheating jet. Such nozzles have been unsatisfactory commercially mainly because the very close manufacturing tolerances, necessary to provide an exactly concentric orifice of uniform width for the annular preheating gas passage, have been impracticable. Consequently, the annular preheating flames produced by such prior nozzles have not been of the same length opposite all points of the annular orifice of the nozzle, which has prevented satisfactory cutting with such nozzles.

The principal objects of this invention are to provide a two-part blowpipe nozzle, having an annular orifice of uniform width, which does not require excessively close manufacturing tolerances to permit accurate assembly of the parts; and to provide such a nozzle having two comparatively simple parts which may be readily assembled and will give the effect of a unitary nozzle construction. These and other objects and the novel features of the invention will become apparent from the following description and the accompanying drawings. In the drawings, Figs. 1 and 2 are central longitudinal sectional views, respectively illustrating the construction of an outer or external member and an inner or internal member of a blowpipe nozzle embodying this invention;

Fig. 3 is a central longitudinal sectional view, illustrating the two members of Figs. 1 and 2 in assembled relation and coupled to the head of a blowpipe;

Figs. 4 and 5 are, respectively, front and rear end views of the nozzle member shown in Fig. 2;

Figure 6:
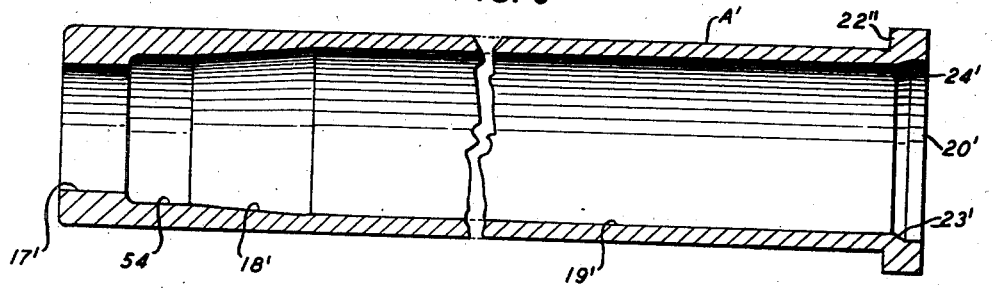
Figs. 6 and 7 are central longitudinal sectional views, respectively illustrating the construction of the external and internal members of another nozzle embodying this invention.
Figure 7:
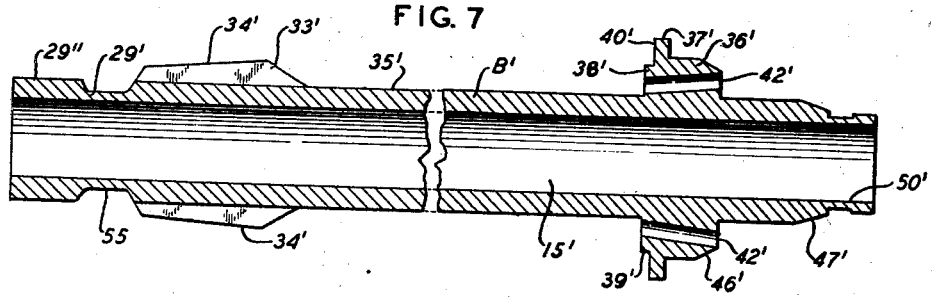

As shown in the drawings, the improved nozzle comprises but two members, an internal member B frictionally secured within an external tubular member A. Each member is made of suitable metal, such as copper, brass, or the like. The internal B has a gas passage 15 extending axially therethrough; and the external A has a larger axial bore therethrough so that, when these two members are properly assembled, a gas passage 16 is provided between the members.

Referring to Figs. 1 to 5 inclusive, the axial bore of the external A comprises a cylindrical orifice portion 17, a rearwardly flaring portion 18 of frusto-conical form, a cylindrical portion 19, and a cylindrical counterbore 20 at its rear end, all coaxial with the main axis of the member A. The portion 17 is smaller in diameter than the rest of the bore, and the diameter of the forward or smaller end of the tapering portion 18 is considerably greater than the inner end of the portion 17, thus leaving a shoulder 21 at their juncture. The counterbore 20 is formed in the rear face of an annular flange 22 at the rear end of the member A. A shoulder 23 is formed at the juncture of the cylindrical portion 19 and the counterbore 20, and the cylindrical wall 24 of the latter provides a centering surface.

The axial bore or passage 15 in the internal B has a flared inlet portion 25, a cylindrical portion 26, a tapering portion 27, and an outlet orifice portion 28 terminating in a tubular extension 29 at the front end of the internal B. The outer diameter of the terminal extension 29 is smaller than the diameter of the orifice portion 17 of the external A, so that an annular outlet orifice 30 of uniform width and coaxial with the passage 28 will be provided when the member B is properly inserted in the member A. Moreover, the outlets of the passages 28 and 30 will also be disposed substantially in the same plane perpendicular to the axis of the nozzle.

At the rear end of the extension 29 there is a shoulder 31; and the extension 29 preferably is substantially longer axially than the passage 17 so that, when the members A and B are assembled, an annular gas distributing and pressure equalizing chamber 32 will be provided between the shoulders 21 and 31, as shown in Fig. 3. The chamber 32 is coaxial with but of considerably greater radial width than the outlet 30.

The exterior surface of the internal B is provided with a plurality of longitudinally extending channels 33 which terminate at the shoulder 31 and establish communication between the chamber 32 and the annular passage or chamber 16 when the internal is fitted in the external.

The entrances of these channels at the chamber 16 are larger in cross section than the exits thereof into the chamber 32. Between each pair of channels 33 there is a longitudinally extending rib or segment 34 which is integral with the member B. These ribs are coextensive with the channels 33 and at their rear ends merge with the exterior cylindrical surface 35 of the internal B. For about one-half or more of its length, the outer surface of each rib 34 is inclined lengthwise and inwardly to its end at the shoulder 31, and this inclination is substantially the same as the slope of the surface 18 relatively to the main axis of the nozzle. The top of each rib 34 is also curved transversely to conform exactly to the circumferential curvature of the cooperating surface 18. Since these ribs are equally spaced around, and corresponding points on the top thereof are at the same distance from, the main axis of the internal B, it will be evident that they will cooperate with the surface 18 to accurately center the front end of the internal B within the external A; and, more particularly, will precisely position the tubular extension 29 concentrically within the passage 17 so as to provide an annular orifice 30 of uniform width throughout its extent.

The internal B has an annular integral collar 36 near its rear end, and an annular flange 37 is formed along the front side of said collar. A cylindrical boss 38, of less height than the depth of the counterbore 20 and of substantially smaller diameter than the flange 37, is also formed integrally with and on the front side of the collar 36. The periphery 39 of the boss cooperates with the surface 24 of the external A to produce a close fit between these portions to centralize the rear end of the internal B within the external A. The annular surface 40, between the surface 39 and the periphery of the flange 37, provides a sealing surface which cooperates with the annular surface 22' of the flange 22 on the external A, to seal the joint between these surfaces.

The tapered surface 18 and the tops of the ribs 34 coooperate to exactly locate and hold the orifice ends of the internal and external members; and the short boss 38 cooperates or interfits with the counterbore 20 to properly locate the rear ends of said members and hold them against lateral play. The tapers of the surface 18 and the tops of the ribs 34 preferably are so dimensioned that the surfaces 22' and 40 on the flanges 22 and 37, respectively, are initially separated a slight distance, say about .015 in., when the internal and external are loosely telescoped together. When the assembled nozzle is tightly coupled to the blowpipe head, this clearance disappears by wedging the tapered ribs into the tapered portion 18. This frictionally and tightly secures the internal and external together and thus produces a unitary nozzle construction, so that the nozzle may be handled as a unit, without falling apart, when it is uncoupled from the blowpipe head. However, by applying axial pressure against one of the members relatively to the other sufficient to overcome such frictional engagement, the members may be separated for inspection, cleaning, repair, or replacement.

A row of inlet passages 42 may be drilled through the collar 36 to establish communication between the nozzle passage 16 and the gas supply passage in the blowpipe head H. The front ends of the passages 42 terminate in the front face of the boss 38 and open into an annular chamber 43 formed between the said front face and the surface 23 of the counterbore 20 in the external A when the latter is assembled with the internal B. The chambers 32, 16 and 43 render the nozzle highly resistant to flashbacks.

The nozzle assembly A, B may be coupled to a suitable blowpipe head H, as shown in Fig. 3, by means of an internally threaded annular coupling nut N which is adapted to be screwed onto an externally threaded part of the head H, to secure the nozzle into sealing relation with suitable seats adjacent gas supply passages opening into a socket in the head. The nut N has an inturned flange 45 which engages the front face of the flange 22 to force and hold the nozzle in place. Inclined annular sealing surfaces 46 and 47 are formed, respectively, on the collar 36 and adjacent the rear end of the internal B; and these sealing surfaces may engage a pair of spaced sealing surfaces 48 and 49 in the socket of the blowpipe head. When the nozzle is so seated and coupled to the head, the rear end 50 of the internal B fits into a recess 51 which communicates with a gas supply passage X; and a chamber 52, communicating with a gas supply passage Y, is formed between the wall of the socket in the head and the opposed faces of the collar 36 and rear end 50. To cut metals with the improved nozzle, oxygen may be supplied through the passage X and a combustible fuel gas, such as a mixture of acetylene and oxygen, may be supplied through the passage Y. The oxygen flows directly through the passage 15; and the combustible mixture flows into the chamber 52, through the inlet passages 42, then successively through the annular chambers 43 and 16 to the entrances of the channels 33, then through these channels and their exits into the distributing chamber 32, and finally is discharged through the outlet 30 as an annular stream of uniform width and length around the oxygen jet discharged from the passage 15.

The nozzle construction shown in Figs. 6 to 10, inclusive, differs in some details from the one just described but also embodies the principles of this invention. The external A' has a larger bore than the external A; and the frusto-conical portion 18' terminates at a distance from the orifice portion 17', leaving an intermediate cylindrical portion 54. Also, the bottom surface 23' of the counterbore 20' is inclined forwardly. Otherwise, the structure and function of the external A' is the same as that of the external A.

Since this nozzle is designed for cutting much thicker plates, the passage 15' of the internal B' is of considerably greater diameter than the passage 15 and may be of uniform diameter throughout its length. An annular groove 55 is formed in the tubular extension 29', leaving a thicker wall 29" around the orifice end of the bore 15'. The wall 29" has the same length as, but a smaller diameter than, the orifice portion 17'; so that an annular orifice 30' of uniform width and wider than the orifice 30 will be provided when the member B' is inserted in the member A', to produce a larger preheating flame of uniform length. The cylindrical portion 54 and the groove 55 are opposed in the assembly and cooperate to provide a distributing and pressure equalizing chamber 32' similar to the chamber 32.

Figure 8:
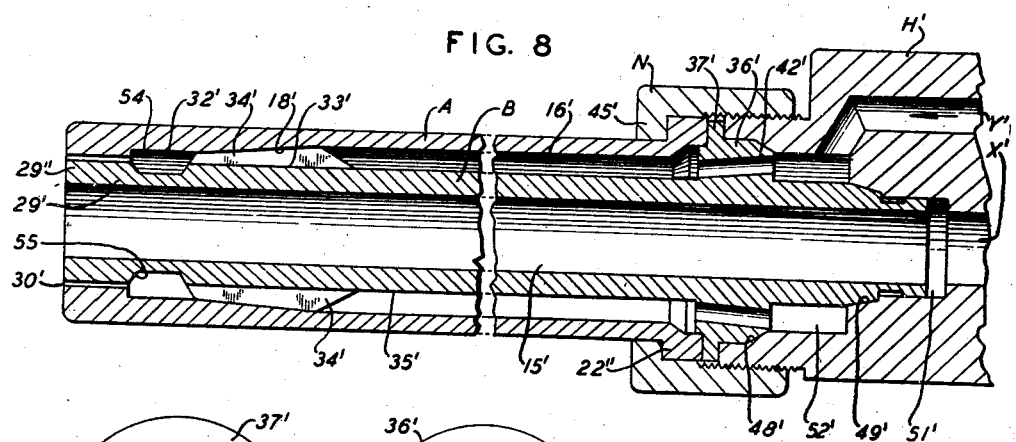
Fig. 8 is a central longitudinal sectional view illustrating the two members of Figs. 6 and 7 in assembled relation and coupled to a blowpipe head.
Figure 9:
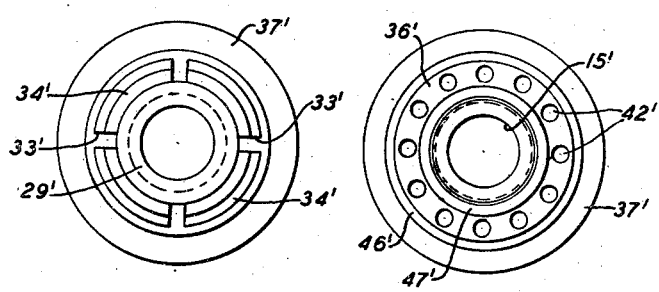
Figs. 9 and 10 are, respectively, front and rear end views of the nozzle member shown in Fig. 7.
Figure 10:
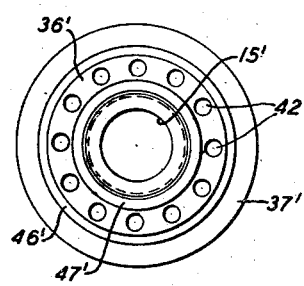

Rearwardly from the groove 55, a number of parallel ribs 34' are formed on the exterior surface 35' of the internal B', and each pair of these ribs is separated by a channel 33' which communicates with the chamber 32' and the annular passage 16'. The tops of the ribs 34' are inclined forwardly and curved transversely to the same degree as the corresponding parts of the tapering portion 18' of the external A' with which they cooperate. Otherwise the construction and functions of the internal B' are the same as those of the internal B. It will also be evident that the assembly of the members A' and B' and the manner of coupling them as a unit to the blowpipe head H, as shown in Fig. 8, is in all respects similar to that already described respecting the nozzle and head assembly shown in Figs. 1 to 5 inclusive.

The construction described lends itself readily to the usual production manufacturing operations and does not require impracticable close tolerances yet insures uniform annular orifices at the outlet ends of the nozzles and accurate fit of the two parts of the nozzles at all points. Therefore, the delivered annular jet will be of uniform length throughout its circumference. The frictional fit of the contacting areas provides a two-part nozzle which is in effect a unitary construction, and this feature facilitates the handling of the nozzle yet renders both members easily accessible for cleaning or repair.

Although the nozzles disclosed are especially adapted for cutting metals, it will be understood that the novel features disclosed are of general application and may be used in certain welding, flame hardening and other nozzles. For example, a combustible gas or other fluid may be supplied to the passage through the internal member to provide a central high-temperature heating flame and another gas or fluid such as an inert gas, may be supplied to the passage between the two members and discharged through the annular orifice to provide a uniform enveloping jet about the central jet.

Minor changes in some details of this construction may be made without departing from the principles of the invention or sacrificing its advantages.

What is claimed is:

1. A cutting blowpipe nozzle comprising an external member having an axial bore provided with a frusto-conical portion between its ends, said bore terminating at one end in a cylindrical orifice portion and at its other end in a counterbore; and an internal member extending into said bore and having a substantially tubular terminal portion extending into and uniformly spaced from the wall of said orifice portion to provide an annular gas outlet of uniform radial width, said internal member having longitudinal ribs spaced apart to provide longitudinal channels, said ribs having their top surfaces inclined and transversely curved to conform to and cooperate with said frusto-conical portion, said nozzle having an annular gas distributing chamber between said annular outlet and the exits of said channels and also having an annular gas passage between said counterbore and the entrances of said channels, said internal member having a boss fitting said counterbore but of less height than the depth of said counterbore so as to leave an annular chamber in said counterbore which communicates with said gas passage, said internal member having gas inlet means communicating with the chamber in said counterbore and also having an axial gas passage therethrough provided with an outlet concentric with said annular gas outlet.

2. A blowpipe nozzle comprising an external member provided with an axial bore having an orifice portion, an adjacent frusto-conical portion, a relatively long cylindrical portion at the rear of said frusto-conical portion, a counterbore provided with an axial centering surface, and a flange provided with a rear sealing surface; an internal member extending into said bore and provided with a terminal portion projecting into said orifice portion and forming an annular outlet passage and a gas distributing and pressure equalizing chamber behind said passage, said chamber being of greater capacity than said passage, said internal member being provided with ribs having longitudinally inclined surfaces frictionally engaging the surface of said frusto-conical portion for accurately centering said terminal portion within said orifice, and a collar positioned forwardly of the rear end of said internal member, said collar having a boss adapted to cooperate with said counterbore to accurately center the rear portion of said internal member relative to said external member, said collar also having a portion adapted to engage said rear sealing surface on said external member.

3. A blowpipe nozzle comprising an external member having an axial passage comprising an orifice portion, an adjacent converging portion, a relatively long cylindrical portion adjacent said converging portion and a counterbore in the rear of said member; and an internal member disposed within said axial passage, said internal member being provided with a terminal portion uniformly spaced from the wall of said orifice portion to form a tubular outlet passage and an annular gas distributing and pressure equalizing chamber adjacent and of greater capacity than said outlet passage, said internal member having longitudinally extending ribs frictionally engaging the converging portion of said axial passage, each pair of ribs having a tapering channel disposed therebetween and substantially coextensive with said engaging surfaces, a relatively long cylindrical portion adjacent said ribs, and a collar adjacent the rear end of said internal member, said collar having a boss adapted to frictionally engage said counterbore to position the rear of the internal member within the external member.

4. A blowpipe nozzle comprising an external member having an axial passage comprising an orifice portion, a relatively short cylindrical portion adjacent and of greater diameter than said orifice portion, a tapering portion adjacent said cylindrical portion, a relatively long cylindrical portion adjacent said tapering portion and a counterbore in a flange in the rear of said member; and an internal member positioned within said axial passage, said internal member being provided with a terminal portion uniformly spaced from the wall of the orifice portion to provide a tubular gas outlet passage, a transversely grooved portion adjacent said terminal portion and adapted to co-operate with said relatively short cylindrical portion to form an annular gas distributing and pressure equalizing chamber of greater capacity than said outlet passage, tapered ribs adapted to frictionally engage said tapering portion, a relatively long cylindrical portion adjacent said ribs, a collar having passages extending therethrough and provided with a boss adapted to fit said counterbore, and a flange adapted to form a seal with the flange of said external member.

HOMER W. JONES.